United States Patent
Dais et al.

(10) Patent No.: US 12,005,525 B2
(45) Date of Patent: Jun. 11, 2024

(54) METHOD AND DEVICE FOR OPERATING A LASER MATERIAL PROCESSING MACHINE

(71) Applicant: Robert Bosch GmbH, Stuttgart (DE)

(72) Inventors: Adina Kerstin Dais, Tamm (DE); Alexander Kroschel, Renningen (DE); Alexander Ilin, Ludwigsburg (DE); Andreas Michalowski, Renningen (DE); Attila Reiss, Renningen (DE); Patrick Ganter, Fellbach (DE); Paul Sebastian Baireuther, Stuttgart (DE); Stephanie Karg, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 338 days.

(21) Appl. No.: 17/234,044

(22) Filed: Apr. 19, 2021

(65) Prior Publication Data
US 2021/0354246 A1    Nov. 18, 2021

(30) Foreign Application Priority Data

May 12, 2020  (DE) .......................... 102020205967.5
Jan. 25, 2021  (DE) .......................... 102021200619.1

(51) Int. Cl.
   *B23K 26/382*   (2014.01)
(52) U.S. Cl.
   CPC .................. *B23K 26/382* (2015.10)
(58) Field of Classification Search
   CPC ...... B23K 26/03; B23K 26/21; B23K 26/382; B23K 31/006; B23K 31/125
   USPC ..................................... 219/121.71
   See application file for complete search history.

(56) References Cited

U.S. PATENT DOCUMENTS

| | | | |
|---|---|---|---|
| 2011/0192825 A1* | 8/2011 | Calefati | B23K 31/12 |
| | | | 219/121.64 |
| 2017/0032281 A1 | 2/2017 | Hsu | |
| 2021/0357555 A1* | 11/2021 | Liu | G06F 30/27 |

FOREIGN PATENT DOCUMENTS

WO   2020056405 A1   3/2020

OTHER PUBLICATIONS

Shahriari, et al.: "Taking the Human Out of the Loop: A Review of Bayesian Optimization", Proceedings of the IEEE, vol. 104, No. 1, (2016), pp. 148-175.

* cited by examiner

*Primary Examiner* — Dana Ross
*Assistant Examiner* — Joseph W Iskra
(74) *Attorney, Agent, or Firm* — NORTON ROSE FULBRIGHT US LLP; Gerard A. Messina

(57) ABSTRACT

A computer-implemented method for operating a laser material processing machine. An estimated result is ascertained as a function of predefined process parameters, which characterize how good an actual result of the laser material processing will be, and the process parameters are varied by means of Bayesian optimization with the aid of a data-based model, until an actual result of the laser material processing is sufficient enough.

12 Claims, 5 Drawing Sheets

METHOD AND DEVICE FOR OPERATING A LASER MATERIAL PROCESSING MACHINE

CROSS REFERENCE

The present application claims the benefit under 35 U.S.C. § 119 of German Patent Application No. DE 102020205967.5 filed on May 12, 2020, and German Patent Application No. DE 102021200619.1 filed on Jan. 25, 2021, which are both expressly incorporated herein by reference in their entireties.

FIELD

The present invention relates to a method for operating a laser material processing machine, to a test stand, to a computer program and to a machine-readable memory medium.

BACKGROUND INFORMATION

Drilling using laser radiation is a manufacturing method for producing holes in widely varying materials. In this method, a workpiece is acted upon using the, for example, pulsed and focused laser beam. As a result of the very high intensity, the absorbed laser energy results in a pulse-like, very rapid warming of the workpiece material, which results in melt formation and to some extent also vaporization on short time scales and spatially very localized.

As a result of the process-related explosively generated vapor pressure and associated therewith also large pressure gradients or also as a result of externally fed gas flows, the melted material is expelled from the bore. At particularly high intensities, which are implemented, for example, by the use of laser radiation with ultra-short pulses, the percentage of vaporization is greater and more precise holes may be obtained.

With longer pulse durations and lower intensities, the formation of the drill hole is clearly dominated by expelled melt, which results in a reduced precision with significantly higher productivity. In many cases, numerous laser pulses per hole are necessary in order to produce the desired drill hole. To improve the drill hole precision, the laser beam may normally be guided at the drilling position by suitable devices on a circular or spiral path.

In the case of the manufacturing method of laser drilling, the process development is typically experimental in character, because the numerous high-dynamic and interacting physical effects are presently not able to be modeled with sufficient accuracy. This also means that the workpiece characteristic data for the relevant pressures and temperatures are often unknown. Highly simplified models at best are available, with which a certain prediction of the targeted drill hole shape is possible at given process parameters and in particular parameter ranges. Reliable predictions regarding quality characteristics such as, for example, solidified melt deposits within the bore or also in the form of a burr at the drill hole entrance, damage to the drill hole edge or also the circularity of the drill holes are presently not possible using these models.

Laser welding is an established manufacturing method for producing connections of workpieces made of different materials. The workpieces to be connected are acted upon in this method by a focused laser beam. As a result of the very high intensity, the absorbed laser energy results in a very rapid local heating of the workpiece materials, which results in a joint melt bath formation on short time scales and in a spatially very localized manner. After solidification of the melt bath, a connection is formed between workpieces in the form of a weld seam.

In order to meet requirements with regard to connection strength (as well as fatigue strength), it may be desirable for the geometry of the weld seam not to fall below a minimally allowable weld seam depth and a minimally allowable weld seam width. In order to obtain the desired weld seam shapes, the process parameters may be selected in such a way, that a rapid and local heating of the materials by the laser radiation results in the vaporization in the melt bath. The melted material is expelled from the melt bath as a result of the process-related, explosively generated vapor pressure and associated high pressure gradients or also as a result of externally fed gas flows. The resulting metallic spatters (so-called weld spatters) may result in a reduction of the component quality and/or necessitate production downtimes for cleaning the laser welding system, which causes a significant increase in the manufacturing costs.

As in the case of laser drilling, the process development (process optimization with the aim of minimizing the weld spatters) is highly experimental in character in the case of laser welding as well, because the numerous high-dynamic and interactive physical effects are not able to be modeled with sufficient accuracy.

One challenge in the case of modeling is that the workpiece characteristic data for the relevant pressures and temperatures are often unknown. The manufacturing tolerances of the individual workpieces and the fluctuations in the materials may also very greatly influence the formation of the weld spatters.

Highly simplified models, with which at given process parameters and in particular parameter ranges, a certain prediction of the achieved weld seam shape is possible, are in fact available, however, a reliable predicting regarding quality characteristics such as, for example, solidified weld spatters are not possible using these models.

Because there are many adjustable process parameters (which are frequently time-dependent and location-dependent), such as laser power, focal diameter, focal position, welding speed, laser beam inclination, circular path frequency, process inert gas, the optimization of the process parameters is a lengthy process that requires a large number of experiments. Because on the one hand many workpieces or components are required for these experiments and on the other hand the evaluation (producing cross sections for the measurement of the weld seam geometry) is also time-consuming, the number of required tests must be reduced to a minimum.

For this reason, some process parameters are set, for example, to experienced-based values and only relatively few parameters are even varied. In this case, the actually achievable optimum is generally not found.

It has been found that during laser material processing, the achievable precision and productivity is very largely a function of the set process parameters, of the workpiece material used and, in part, also of its geometry.

The quality criteria of a drilling process are numerous. A size of the drill hole (for example, a depth-related diameter profile), a circularity of the bores, a shape of the drill hole wall, any melt deposits, droplet ejection during the drilling process and a rounding of the drill hole edges are important, for example. The productivity is typically defined by the number of producible holes per unit of time. In addition, in practice the costs of the necessary production equipment are, of course, also decisive; with increasing flexibility of the variable parameters, normally also comes an increase in costs.

Because there are many adjustable parameters (for example, pulse duration, focal position, focal length, pulse repetition frequency, circular path diameter, circular path frequency, setting angle, drill duration, pulse energy, wavelength, type of process gas and process gas pressure), which may often times vary as a function of time, the optimization of the process parameters is a lengthy process that requires a large number of experiments. Because on the one hand many workpieces or components are required for these experiments and on the other hand the evaluation (in particular, of the inner drill hole shape) is also time-consuming, the number of required tests must be reduced to a minimum.

For this reason, some parameters are set, for example, to experience-based values and only relatively few parameters are even varied. For this reason, it is possible in general only with great difficulty to find the actually achievable optimum. Test series predefined by experts and/or also methods of statistical test planning are possible as planning methods for the tests.

In the case of laser welding as well, because there are many adjustable process parameters (which are often time-dependent and location-dependent), such as laser power, focal diameter, focal position, welding speed, laser beam inclination, circular path frequency, process inert gas, the optimization of the process parameters is a lengthy process that requires a large number of experiments. Because on the one hand many workpieces or components are required for these experiments and on the other hand the evaluation (producing cross sections for the measurement of the weld seam geometry) is also time-consuming, it is desirable that the number of required tests is reduced to a minimum.

SUMMARY

An example embodiment of the present invention may have the advantage over the related art that with only few experiments, it is possible to find process parameters of laser material processing machines that ensure a high quality of the laser material processing.

Further aspects of the present invention are described herein. Advantageous refinements and embodiments of the present invention are described herein.

The present invention relates to the method for being able to carry out an efficient and targeted optimization of the process parameters. In accordance with an example embodiment of the present invention, for this purpose, the Bayesian optimization method is utilized. With the aid of this method, it is possible to find optima in unknown functions. An optimum is characterized by target values $q_{i,target}$ for one or multiple quality characteristics (features) $q_i$, which are specified by a user. Multiple quality characteristics may be allocated in a so-called cost function K, in order to obtain one single function to be optimized. This cost function must also be predefined by the user. One example is the sum of scaled deviations from the respective target value:

$$K \Sigma_{i=1}^{N} s_i |q_i - q_{i,target}| \tag{1}$$

The parameters $s_i$ in this case are predefinable scaling parameters. In order to find the optimum of the cost function, process parameter sets (also referred to hereinafter in short as parameter sets) for the next experiment may be provided by the use of the Bayesian optimization. Once the experiment has been carried out, the values of the quality criteria resulting therefrom and thus the instantaneous cost function value may be determined and, together with the adjusted parameter set, provided as a data point to the optimization method.

The Bayesian optimization method is suitable for finding that parameter set for a function that maps a multi-dimensional parameter space onto scalar values, which results in the optimum function value. Depending on the optimization target, the optimum in this case is defined as the preferably largest or alternatively also minimally achievable value, which the function values are able to assume. In terms of the process optimization, the parameter set is provided, for example, by a particular set of process parameters; the associated function value may be ascertained via the above described cost function.

Because experiments must be carried out and evaluated for determining the function values of the cost function, in principle, only one value table including data from the function is available, which also include an experimental "noise".

Because the experiments are very time-consuming, it is normally not possible to suppress this noise via numerous repetitions with the same parameter set with subsequent averaging of the results. For this reason, it is advantageous to carry out the optimization using a method which, despite fewer test evaluations, also enables a global optimization with good results and, in the process, manages without a calculation of gradients of the cost function. It has been found that the Bayesian optimization satisfies these characteristics.

The Bayesian optimization includes the mathematical method of the Gaussian processes, with which a prediction of the likeliest function value, including its variance, results for each parameter set based on a given value table, and an algorithmically worded instruction for which parameter set a further function evaluation (in our case, i.e., an experiment) is to be carried out, which is based on the predictions of the Gaussian process.

Specifically, the prediction for the result of the function evaluation in a parameter set $x_{N+1}$ is provided by the likeliest value ("mean value") of the Gaussian process $$m(x_{N+1}) = k^T C_N^{-1} t \tag{2}$$

where the variance is $$\sigma^2(X_{N+1}) = c - k^T C_N^{-1} k \tag{3}$$

Here, $C_N$ means the covariance matrix, which is provided by $$[C_N]_{nm} = k(x_n, x_m) + \beta^{-1} \delta_{nm}, \text{ where } n,m = 1 \ldots N, \tag{4}$$

$x_n$ and $x_m$ being parameter sets, in which a function evaluation has already taken place. Variable $\beta^{-1}$ represents the variance of the normal distribution, which describes the diversification of experiments with the same parameter set, $\delta_{nm}$ is the Kronecker symbol. The scalar c is conventionally provided by $c = k(x_{N+1}, x_{N+1}) + \beta^{-1}$. Vector t includes the respective results for individual parameter sets $x_n$ (n=1 ... N), in which a function evaluation has taken place. Core function $k(x_n, x_m)$ describes to what extent the result of the function evaluation in a parameter set $x_n$ still influences the result of the function evaluation in a parameter set $x_m$. High values in this case stand for a strong influence, if the value is zero, there is no longer any influence.

For the prediction of the mean value and of the variance in the above formula, vector k is calculated with $[k]_n = k(x_n, x_{N+1})$, in addition, with respect to all parameter sets, $x_n$ (n=1 ... N) and parameter set $x_{N+1}$ to be predicted. For the core function to be used in the specific case, there are different approaches, one simple approach is represented by the following squared exponential core function:

$$k(x_n, x_m) = \Theta_0^2 \exp(-\Sigma_{d=1}^D (x_{n,d} - x_{m,d})^2 / (2\Theta_d^2)), \quad (5)$$

including selectable hyper-parameters $\Theta_0$ and $\Theta_d$ (d=1 ... D), D being the dimensionality of the parameter space. In this core function $\Theta_0$ describes the scale one which the function values vary and $\Theta_d$ the influence of the "distance" in the parameter space on the correlation of two function values in parameter sets $x_n$ and $x_m$. Other core functions are possible.

The selection of the next parameter set on which a test is to be carried out is based on the predictions of mean values and variance calculated with the above formulas. Here, different strategies are possible, for example, that of "expected improvement".

In this case, that parameter set for the next experiment is selected, in which the expectation value for finding a function value, which is greater (or smaller, depending on the optimization target) than the largest (or smallest, depending on the optimization target) known function value $f_N^*$ of the previous N iterations, i.e., $$x_{N+1} = \underset{x}{\mathrm{argmax}} E_f[[f(x) - f_N^*]^+], \quad (7)$$

becomes maximal. The possible function values f(x) at position x are normally distributed in this case with median value according to formula (2) and variance according to formula (3), each with $x_{N+1} = x$. Such a function to be optimized is also referred to as an acquisition function. Other acquisition functions are possible, for example, a knowledge gradient or an entropy search.

The "+" operator here means that only positive values are used and negative values are set to zero. In the Bayesian optimization, a new test point (i.e., parameter set) is now iteratively determined,
a test is iteratively carried out,
the Gaussian process is iteratively updated with the new function value
until the optimization is aborted.

The optimization of the Gaussian process including the new test point and the new function value occurs in such a way that the new pair made up of test point and function value is added to the already incorporated test data made up of pairs of test points and function values, and the hyper-parameters are adapted in such a way that a probability (for example, a likelihood) of the test data is maximized.

This process is illustrated in conjunction with FIG. 4.

Using the iterative approach of the previously described steps (execution of an experiment, evaluating the quality criteria and determining the cost function value, update of the Gaussian process and proposing the next parameter set), it is possible to successively construct a process model (mapped by the Gaussian process). The best parameter set of all evaluated function evaluations or tests is then used as the best optimization result.

Advantages are obtained when carrying out the optimization by incorporating existing process knowledge. Using the approach described below, it is possible to incorporate knowledge in the form of one or of multiple process models $P_1 \ldots n$ into the optimization by replacing real experiments under particular conditions with simulation experiments. It is irrelevant in this case with what uncertainty the models map the process and how many of the quality criteria they describe.

With a process model that would perfectly map the real experiment, it would be possible to replace every real experiment with a simulation experiment. If, in the process, the period of evaluation were shorter than the real implementation, time, in addition to effort, would be saved. In general, however, the prediction accuracy of the process models is limited. They are often valid only in a subarea of the parameter space and/or describe only a subset of the process results, and do not take all physical effects into account and generate therefore results only within an uncertainty band. As a rule, therefore, process models are not fully able but only partially able to replace physical models.

Within the context of the present invention described herein, the process simulation models, which are able to predict a subset of the relevant features with a known accuracy, are initially called up with each iterative optimization step. If, based on the predicted process result, it may be ruled out with sufficient certainty also within the scope of the prediction accuracy, that the process result will be close to the target values, then no real experiment is carried out. Instead, the results calculated here using the process model are used alternatively as an experimental result and the optimization process is continued.

If multiple process simulation models including different prediction accuracies for different areas in the parameter space are available, the one that has the best prediction accuracy may be used in each case.

Thus, in one first aspect, the present invention relates to a computer-implemented method for operating a laser material processing machine. In accordance with an example embodiment of the present invention, in the method, as a function of predefined process parameters, in particular, without activating the laser material processing machine, an estimated result of the laser material processing being ascertained in a simulative manner, which characterizes how good an actual result of the laser material processing with these process parameters will be, and the process parameters being varied by means of Bayesian optimization with the aid of a data-based model, which is configured to estimate the result of the laser material processing as a function of the process parameters, until an actual result of the laser material processing is sufficient enough.

This may take place in that a value of a cost function is ascertained as a function of estimated variables or as a function of actual variables, the estimated variables characterizing the estimated result of the laser material processing and the actual variables characterizing the actual result of the laser material processing, and it then being ascertained whether this value of the cost function falls below a predefinable threshold value. Variables that characterize an estimated or actual result of the laser material processing may in this case characterize the product produced with the laser material processing and/or the process of producing.

The value of the cost function in this case may be ascertained as a function of how much the estimated or actual variables deviate from setpoint variables, which characterize a setpoint result of the laser material processing.

Using the Bayesian optimization, it is possible to quickly ascertain an optimum in a predefinable parameter range, without having to ascertain gradients, which would not only necessitate numerous actual steps of the laser material processing, but which could be only unreliably ascertained via difference quotients due to the unavoidable experimental noise. In order to get this noise sufficiently low, many tests would be necessary, which may be saved by using the Bayesian optimization. In addition, the Bayesian optimization makes it possible to ascertain the global optimum.

In order to reduce as best as possible the actually required steps of the laser material processing, the process parameters may initially be varied until the estimated result is sufficient enough, and only then is the actual result of the laser material processing for these process parameters detected. In other words, an actual experiment for ascertaining the actual result is carried out only if the simulation experiment suggests that a good, actual, i.e., experimental result is to be expected.

The data-based model may then be trained as a function of the actual result, i.e., as a function of actual variables that characterize the actual result.

It is, in particular, possible that the data-based model is trained, i.e., updated as a function of the estimated result, i.e., as a function of estimated variables that characterize the estimated result.

Despite the deficiencies of the estimated result, it may be advantageous to train the data-based model therewith, in order to achieve therewith a reduction of the actually required steps of the laser material processing.

In order to suppress any erroneous training of the data-based model, it may be provided that in cases in which estimated result $y_{sim}$ is sufficient enough, i.e., sufficiently close to the optimization target, the data-based model is not trained as a function of the estimated result, but only as a function of the actual result.

As described above, the data-based model may advantageously be a Gaussian process model. This allows for a particularly targeted variation of the process parameters since, in addition to the estimated result, it is also possible to ascertain and take into account an uncertainty of the estimated result and an uncertainty of the actual result, in particular, as a result of noise.

Alternatively or in addition, it may be provided that the estimated result is ascertained with the aid of a physical model of the laser material processing; it may be provided that if the evaluation of the physical model were to take place using parameters outside a predefinable range, the estimated result is ascertained with the aid of the data-based model. Any known deficiencies of the physical model may hereby be compensated for in a particularly simple manner.

It is understood that the estimated result may include a plurality of variables. In this case, it may be provided that the data-based model is a multi-dimensional model, or that a plurality of one-dimensional models corresponding to the plurality of variables is used, or that a mixture of one-dimensional and multi-dimensional models is used.

Since physical simulation models are sometimes able to predict only a subset of the features relevant for the optimization, values for the estimated result may still be ascertained with the aid of heuristics. In one further aspect, it is therefore provided that the estimated result is ascertained with the aid of a physical model evaluated with the pre-defined process parameters, and with the aid of actual results ascertained with other process parameters.

BRIEF DESCRIPTION OF THE DRAWINGS

Specific embodiments of the present invention are explained in greater detail below with reference to the figures.

DETAILED DESCRIPTION OF EXAMPLE EMBODIMENTS

Figure 1:
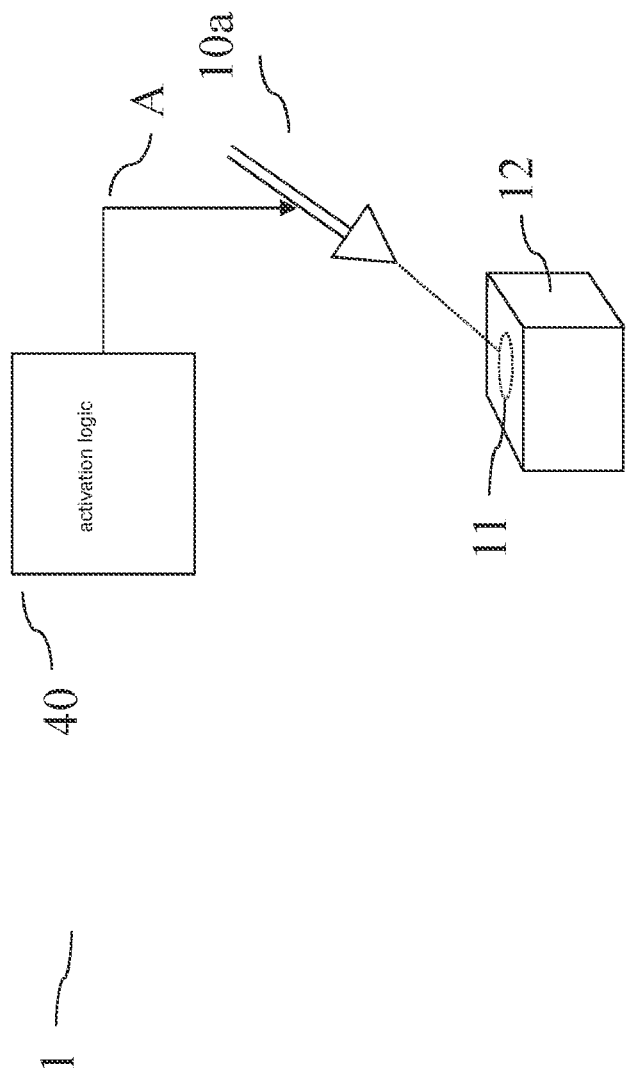
FIG. 1 schematically shows a structure of a laser drilling machine, in accordance with an example embodiment of the present invention.

FIG. 1 schematically shows a structure of a laser drilling machine 1. An activation signal A is provided by an activation logic 40 in order to activate a laser 10a. The laser beam strikes a material piece 12, where it produces a drill hole 11.

Figure 2:
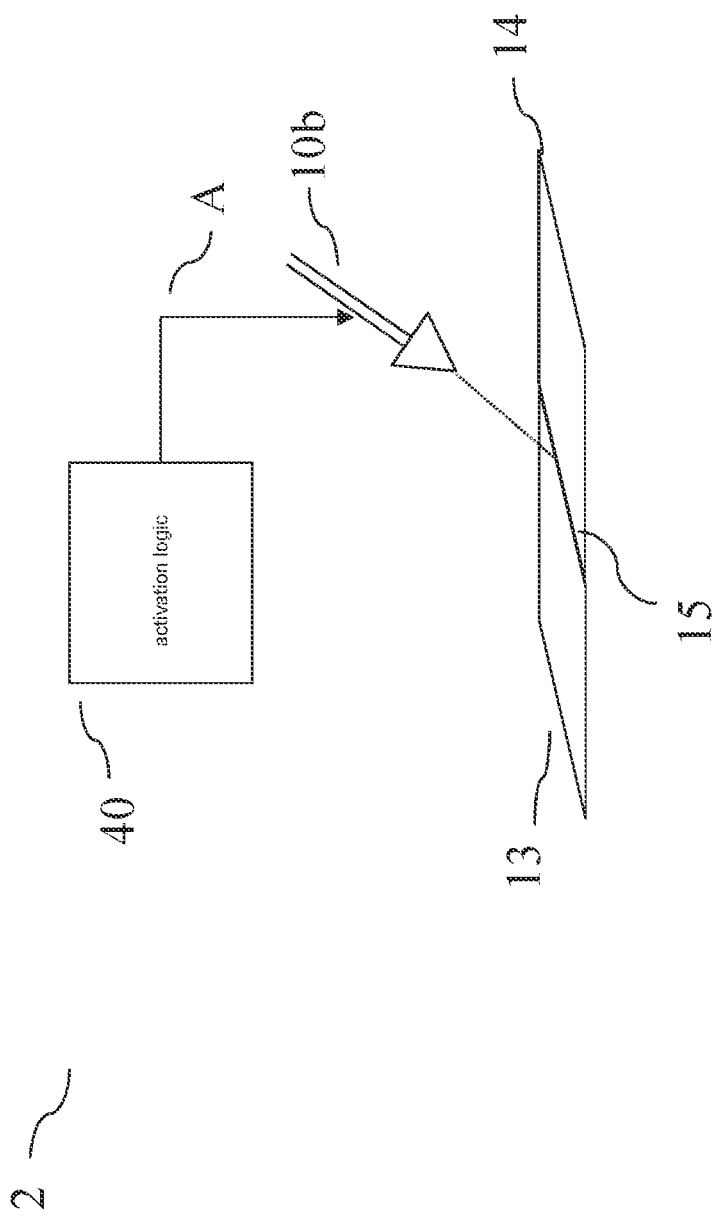
FIG. 2 schematically shows a structure of a laser welding machine, in accordance with an example embodiment of the present invention.

FIG. 2 schematically shows a structure of a laser welding machine 2. Here, too, an activation signal A is provided by an activation logic 40 in order to activate a laser 10b. The laser beam strikes two material pieces 13, 14 where it produces a weld seam 15.

A laser cutting machine (not shown) is similarly also possible.

Figure 3:
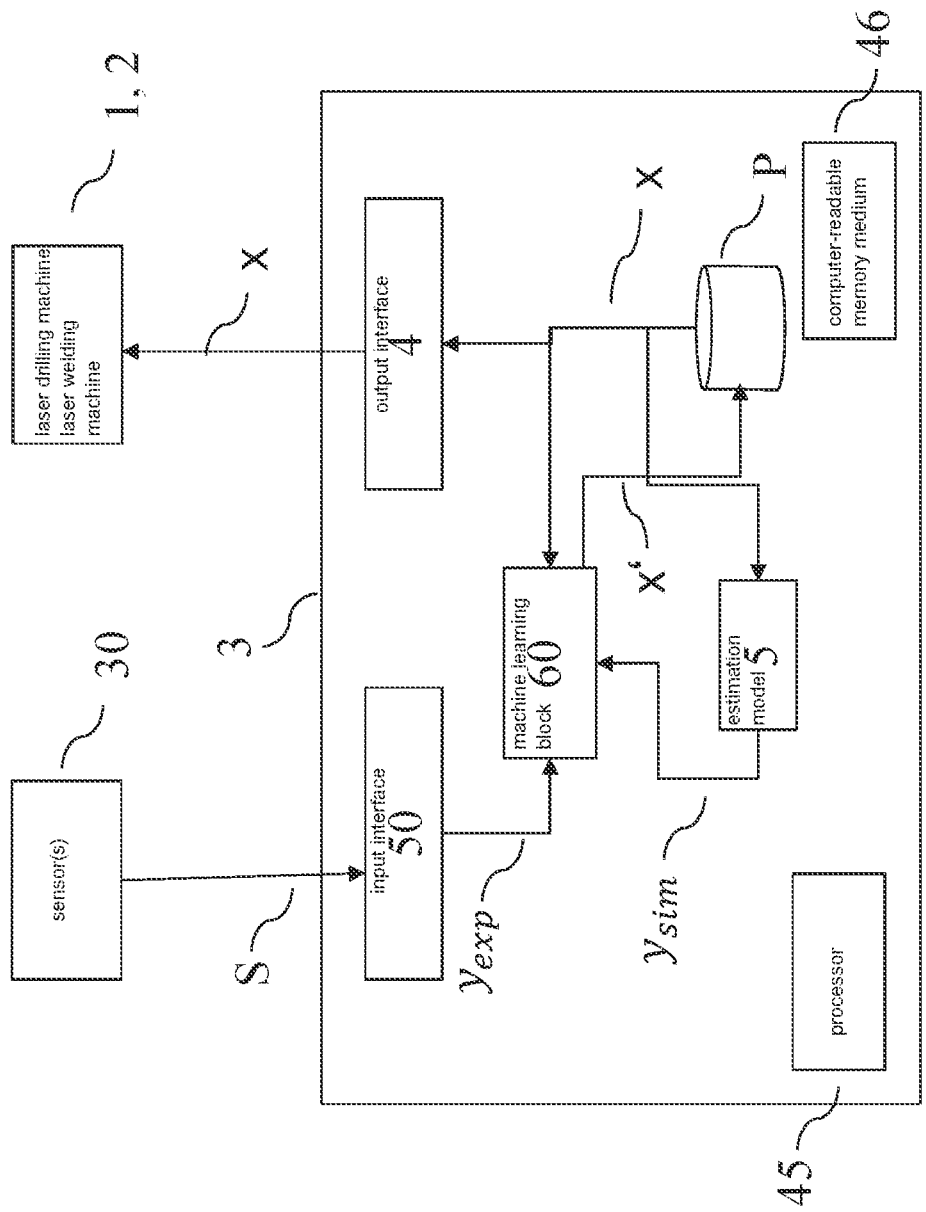
FIG. 3 schematically shows a structure of a test stand, in accordance with an example embodiment of the present invention.

FIG. 3 schematically shows a structure of a test stand 3 for ascertaining optimum process parameters x. Instantaneous parameters x are provided by a parameter memory P via an output interface 4 of the laser material processing machine such as, for example, laser drilling machine 1 or laser welding machine 2. This carries out the laser material processing as a function of these provided process parameters x. Sensors 30 ascertain sensor variables S, which characterize the result of the laser material processing. These sensor variables S are provided as quality characteristics $y_{exp}$ to a machine learning block 60 via an input interface 50.

Figure 4:
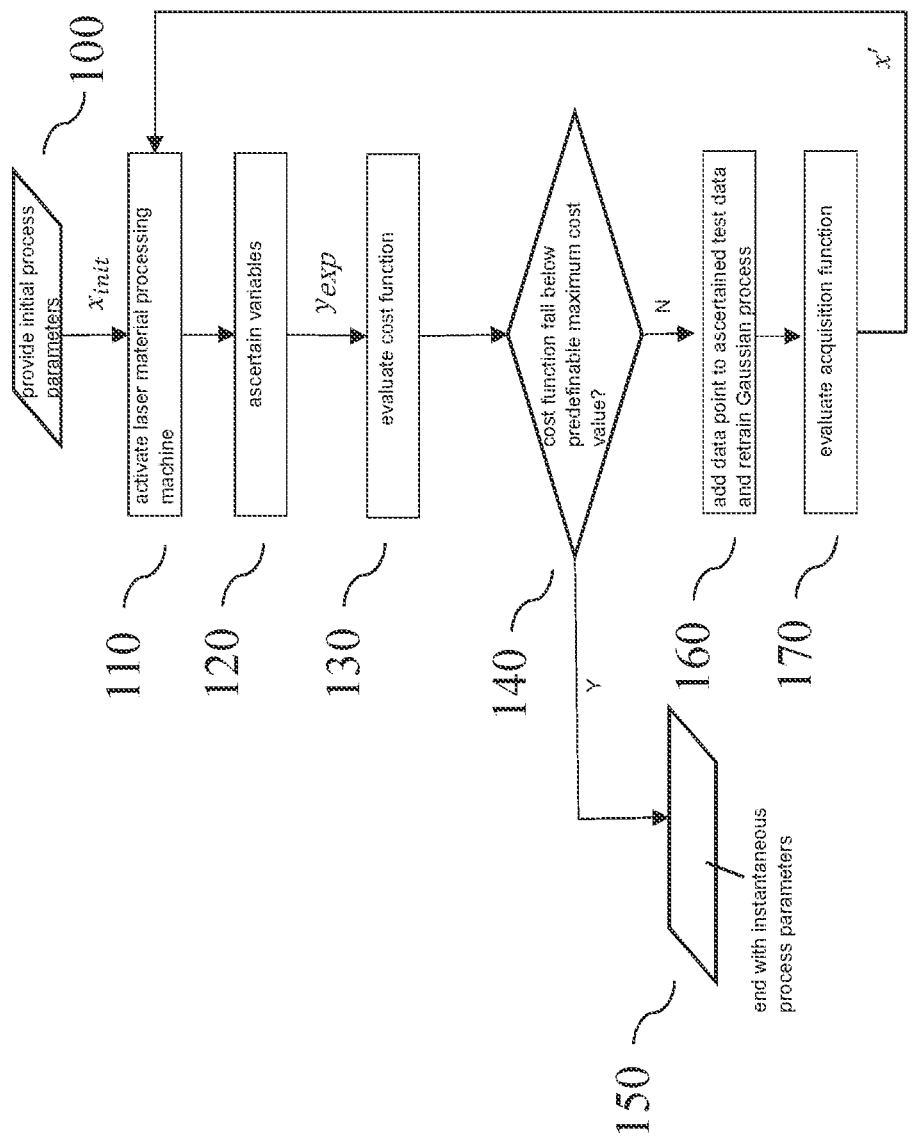
FIG. 4 shows in a flowchart one specific embodiment for operating the test stand, in accordance with an example embodiment of the present invention.
Figure 5:
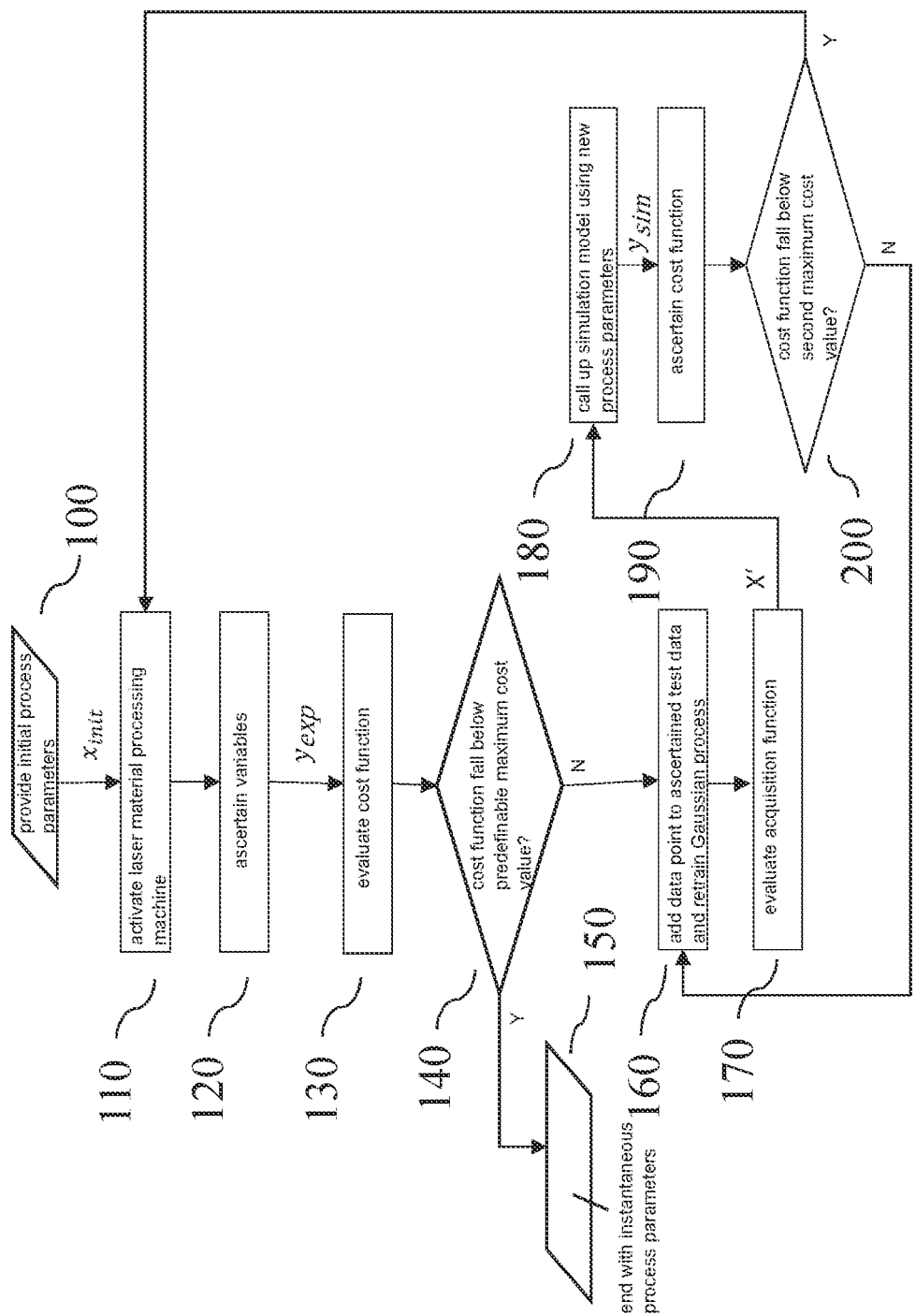
FIG. 5 shows in a flowchart one specific embodiment for operating the test stand, in accordance with an example embodiment of the present invention.

Machine learning block 60 in the exemplary embodiment includes a Gaussian process model which, as illustrated in FIG. 4 and in FIG. 5, is trained as a function of provided quality characteristics $y_{exp}$. Varied process parameters which are stored in parameter memory P, may be provided as a function of the Gaussian process model.

Process parameters x may alternatively or additionally be provided for provision via output interface 4 also to an estimation model 5, which provides estimated quality characteristics $y_{sim}$ instead of actual quality characteristics $y_{exp}$ to machine learning block 60.

The test stand in the exemplary embodiment includes a processor 45, which is configured to run a computer program stored on a computer-readable memory medium 46. This computer program includes instructions, which prompt processor 45 to carry out the method illustrated in FIG. 4 and in FIG. 5 when the computer program is run. This computer program may be implemented in software, or in hardware, or in a mixed form of hardware and software.

FIG. 4 shows in a flowchart an exemplary method for operating test stand 3. The method starts 100 by providing initial process parameters $x_{init}$ as process parameters x and initializing previously recorded test data as an empty set. Process parameters x are optionally predefined using a design-of-experiment method and, as discussed in greater detail below, laser material processing machine 1, 2 activated using these process parameters x, ascertains variables $y_{exp}$ and trains the Gaussian process using the test data thus ascertained.

In the case of laser drilling, these parameters x in one exemplary embodiment include a pulse duration and/or a focal position time-dependently resolved via a characteristic map and/or a focal length and/or a pulse repetition frequency and/or a circular path diameter time-dependently resolved via a characteristic map and/or a circular path frequency and/or a setting angle time-dependently resolved via a characteristic map and/or a drilling duration and/or a pulse energy time-dependently resolved via a characteristic map and/or a wavelength and/or parameters, which characterize a process inert gas such as, for example, a process gas type or a process gas pressure). The aforementioned circular path in this case is a known feature in many drilling methods, for example, in twist drilling or in trepanning drilling.

In the case of laser welding, these process parameters x include laser power time-dependently and/or location-dependently resolved via characteristic maps and/or a focal diameter and/or a focal position and/or a welding speed and/or a laser beam inclination and/or a circular path frequency of a laser wobbling and/or parameters that characterize a process inert gas.

With instantaneous process parameters x, laser material processing machine 1, 2 is activated 110 and variables $y_{exp}$ ascertained 120, which characterize the actual result of the laser material processing.

In the case of laser drilling, these variables $y_{exp}$ in one exemplary embodiment include variables, which characterize the size of drill hole 11 and/or the circularity of drill hole 11 and/or the shape of a wall of drill hole 11 and/or the presence of melt deposits and/or a quantity of droplet ejection during the drilling process and/or a rounding of the edges of drill hole 11 and/or the productivity.

In the case of laser welding, these variables $y_{exp}$ in one further exemplary embodiment include variables, which characterize a minimum weld seam depth and/or a minimum weld seam width and/or the productivity and/or a number of weld spatters and/or a number of pores and/or a weld delay and/or weld-internal stresses and/or weld cracks along weld seam 15.

As a function of these variables, a cost function K is evaluated 130, as it may be provided, for example, by equation 1, the variables $y_{exp}$ being provided as features $q_i$ and corresponding target values of these variables a $q_{i,target}$.

A cost function K is also possible, which penalizes deviations of the features from the target values, in particular, if they exceed a predefinable tolerance distance, and rewards a high productivity. The "penalizing" may, for example, be implemented by a high value of cost function K, the "rewarding" correspondingly by a low value.

It is then ascertained whether cost function K indicates that instantaneous process parameters x are sufficient enough; in the event a penalty resulting therefrom means a high value and a reward means a low value by checking whether cost function K falls below 140 a predefinable maximum cost value. If this is the case ("yes"), the method ends 150 with instantaneous process parameters x.

If this is not the case ("no"), data point $x, y_{exp}$ thus ascertained from process parameters x and associated variables $y_{exp}$ characterizing the result is added 160 to the ascertained test data and the Gaussian process is retrained, i.e., hyper-parameters $\Theta_0, \Theta_d$ of the Gaussian process are adapted in such a way that a likelihood that the test data result from the Gaussian process is maximized.

An acquisition function is then 170 evaluated, as it is illustrated, for example, in formula 7, and new process parameters x' are thereby ascertained. A branching back to step 110 then takes place.

FIG. 5 shows in a flowchart one further exemplary method for operating test stand 3. Steps 100 through 170 are the same as illustrated in FIG. 4, a separate description is therefore omitted.

After new process parameters x' have been ascertained, however, a simulation model is called up 180 using these new process parameters x' in order to ascertain estimated variables $y_{sim}$ instead of actual variables $y_{exp}$.

In the case of laser drilling, this may take place, for example, as follows: for a radius r of drill hole 11 along a depth coordinate z, r(z) is numerically ascertained as a resolution of the equation $$[1 - R(r, z, \alpha, \theta)] \cdot \cos\theta \cdot F_0(r, z) - \tilde{F}_{th} = 0 \quad (8)$$

where $$1 - R = \quad (9)$$
$$\frac{1}{2} \cdot \left( \frac{4n \cos\theta}{(n^2 + k^2) + 2n \cos\theta + \cos^2\theta} + \frac{4n \cos\theta}{(n^2 + k^2)\cos^2\theta + 2n \cos\theta + 1} \right)$$

$$F_0(r, z) = \frac{2Q}{\pi w^2(z)} \cdot \exp\left(-\frac{2r^2}{w^2(z)}\right) \quad (10)$$

$$w(z) = \frac{d_{Fok}}{2} \sqrt{1 + \left(\frac{z}{l_{Rayleigh}}\right)^2} \quad (11)$$

$$\tan\alpha = \frac{r}{w(z)} \frac{dw(z)}{dz} \quad (12)$$

In this case:
$\bar{n} = n + ik$ is a predefinable complex refractive index of material piece 12, including refractive index n and extinction coefficient k
$\tilde{F}_{th}$ is a predefinable ablation threshold fluence of material piece 12,
Q is a predefinable pulse energy of laser 10a,
$d_{Fok}$ is a predefinable focal diameter of laser 10a,
$l_{Rayleigh}$ is a predefinable Rayleigh length of laser 10a,
R is an ascertained reflectivity of material piece 12,
$\alpha$ is an ascertained angle of the local beam propagation direction,
$\theta$ is a predefinable relative angle between incident laser beam and surface normals of material piece 12,
$F_0$ is an ascertained irradiated fluence of laser 10a,
w(z) is an ascertained local beam radius The prediction of several features such as a presence of melt deposits and/or a quantity of droplet ejection during the drilling process is not possible with this model. To ascertain these features, either an empirical model may be predefined or a result may be ascertained from the values experimentally ascertained up to this point in time such as, for example, a mean value of all these values, or a weighting of these experimentally ascertained actual values may take place as a function of a separation of the instantaneous process parameters from those process parameters, for which the respective experimentally ascertained actual values have been determined. It is possible, in particular, that predictions of Gaussian processes that have been trained based on actual variables may be used as estimated values.

Alternatively or in addition, it is possible that at least some of the features are not able to be reliably calculated for all process parameters x. It is possible that it is checked whether instantaneous parameters x fall within a predefinable range, and that if this is not the case, the features are then ascertained with the aid of one of the aforementioned approaches.

In the case of laser welding, the ascertainment of estimated variables $y_{sim}$ may take place, for example, as follows:

$$T(x, y, z) - T_0 = \frac{1}{2\pi\lambda h}\exp\left(-\frac{v(x-x_0)}{2a}\right) \quad (13)$$

$$\left(q_{net}K_0\left(\frac{vr}{2a}\right) + 2\sum_{m=1}^{\infty}\cos\left(\frac{m\pi z}{h}\right)K_0\left(\frac{vr}{2a}\sqrt{1+\left(\frac{2m\pi a}{vh}\right)^2}\right)I_m\right)$$

with $$r = \sqrt{(x-x_0)+y^2} \quad (14)$$

$$I_m = \int_0^h q_{1net}(z)\cos\left(\frac{m\pi z}{h}\right)dz \quad (15)$$

and the parameters $T_0$—a predefinable ambient temperature $x_0$—a predefinable offset of the beam of laser 10b relative to the origin of a coordinate system movable with laser 10b $\lambda$—a predefinable heat conductivity of material pieces 13, 14;

$\alpha$—a predefinable temperature conductivity of material pieces 13, 14;

$q_{net}$—a predefinable power of laser 10b;

$q_{1net}$—a predefinable power distribution of laser 10b along a depth coordinate of material pieces 13, 14;

v—a predefinable speed of laser 10b;

h—a predefinable thickness of material pieces 13, 14;

and Bessel function $$K_0(\omega) = \frac{1}{2}\int_{-\infty}^{\infty}\frac{e^{i\omega t}}{\sqrt{t^2+1}}dt$$

as well as an ascertained temperature distribution T(x,y,z). A width and a depth of the weld seam may be ascertained from the temperature distribution (for example, via the ascertainment of isotherms at a melting temperature of one material of material pieces 13, 14).

Cost function K is subsequently 190 ascertained similar to step 130, simulatively estimated variables $y_{sim}$ being used instead of experimentally ascertained variables $y_{exp}$.

It is then 200 checked similar to step 140 with the aid of cost function K whether or not instantaneous process parameters x are sufficient enough, instead of the predefinable maximum cost value, a second maximum cost value being capable of being used, which is greater than the predefinable maximum cost value.

If the check has indicated that instantaneous process parameters x are sufficient enough, then a branching back to step 110 takes place. Otherwise, a branching back to step 160 takes place.

What is claimed is:

1. A computer-implemented method for operating a laser material processing machine, the method comprising the following steps:
    performing laser material processing using first process parameters, and detecting a variable characterizing a result of the laser material processing;
    varying the process parameters by means of Bayesian optimization based on the first process parameters and the detected variable to produce second process parameters;
    ascertaining an estimated result of the laser material processing as a function of the second process parameters produced using the Bayesian optimization, which estimates the variable characterizing the result of the laser material processing;
    evaluating a cost function based on the estimated variable;
    when the evaluated cost function is above a threshold, further varying the process parameters by means of the Bayesian optimization based on the second process parameters and the estimated variable to produce third process parameters; and
    when the evaluated cost function is below the threshold, performing the laser material processing using the second process parameters.

2. The method as recited in claim 1, wherein a data-based model of the Bayesian optimization is trained as a function of the detected variable.

3. The method as recited in claim 2, wherein the data-based model is also trained as a function of the estimated variable.

4. The method as recited in claim 1, wherein the data-based model is a Gaussian process model.

5. The method as recited in claim 1, wherein the estimated variable is ascertained using a model of the laser material processing.

6. The method as recited in claim 5, wherein the estimated variable is ascertained using a model evaluated with the second process parameters and using the detected variable ascertained with other process parameters.

7. The method as recited in claim 1, wherein the laser material processing machine is a laser drilling machine.

8. The method as recited in claim 7, wherein the variable characterizes a geometry of a hole drilled by the laser drilling machine.

9. The method as recited in claim 1, wherein the laser material processing machine is a laser welding machine.

10. The method as recited in claim 9, wherein the variable characterizes a geometry of a weld seam welded by the laser welding machine.

11. A test stand for a laser material processing machine, the test stand configured to:
    perform laser material processing using first process parameters, and detecting a variable characterizing a result of the laser material processing;
    vary the process parameters by means of Bayesian optimization based on the first process parameters and the detected variable to produce second process parameters;
    ascertain an estimated result of the laser material processing as a function of the second process parameters produced using the Bayesian optimization, which estimates the variable characterizing the result of the laser material processing;
    evaluating a cost function based on the estimated variable;
    when the evaluated cost function is above a threshold, further varying the process parameters by means of the Bayesian optimization based on the second process parameters and the estimated variable to produce third process parameters; and
    when the evaluated cost function is below the threshold, performing the laser material processing using the second process parameters.

12. A non-transitory machine-readable memory medium on which is stored a computer program for operating a laser material processing machine, the computer program, when executed by a computer, causing the computer to perform the following steps:

perform laser material processing using first process parameters, and detecting a variable characterizing a result of the laser material processing;
vary the process parameters by means of Bayesian optimization based on the first process parameters and the detected variable to produce second process parameters;
ascertain an estimated result of the laser material processing as a function of the second process parameters produced using the Bayesian optimization, which estimates the variable characterizing the result of the laser material processing;
evaluating a cost function based on the estimated variable;
when the evaluated cost function is above a threshold, further varying the process parameters by means of the Bayesian optimization based on the second process parameters and the estimated variable to produce third process parameters; and
when the evaluated cost function is below the threshold, performing the laser material processing using the second process parameters.

\* \* \* \* \*